Oct. 13, 1942.   C. S. ASH   2,298,334
AUTOMOTIVE VEHICLE
Filed April 1, 1940   4 Sheets-Sheet 1
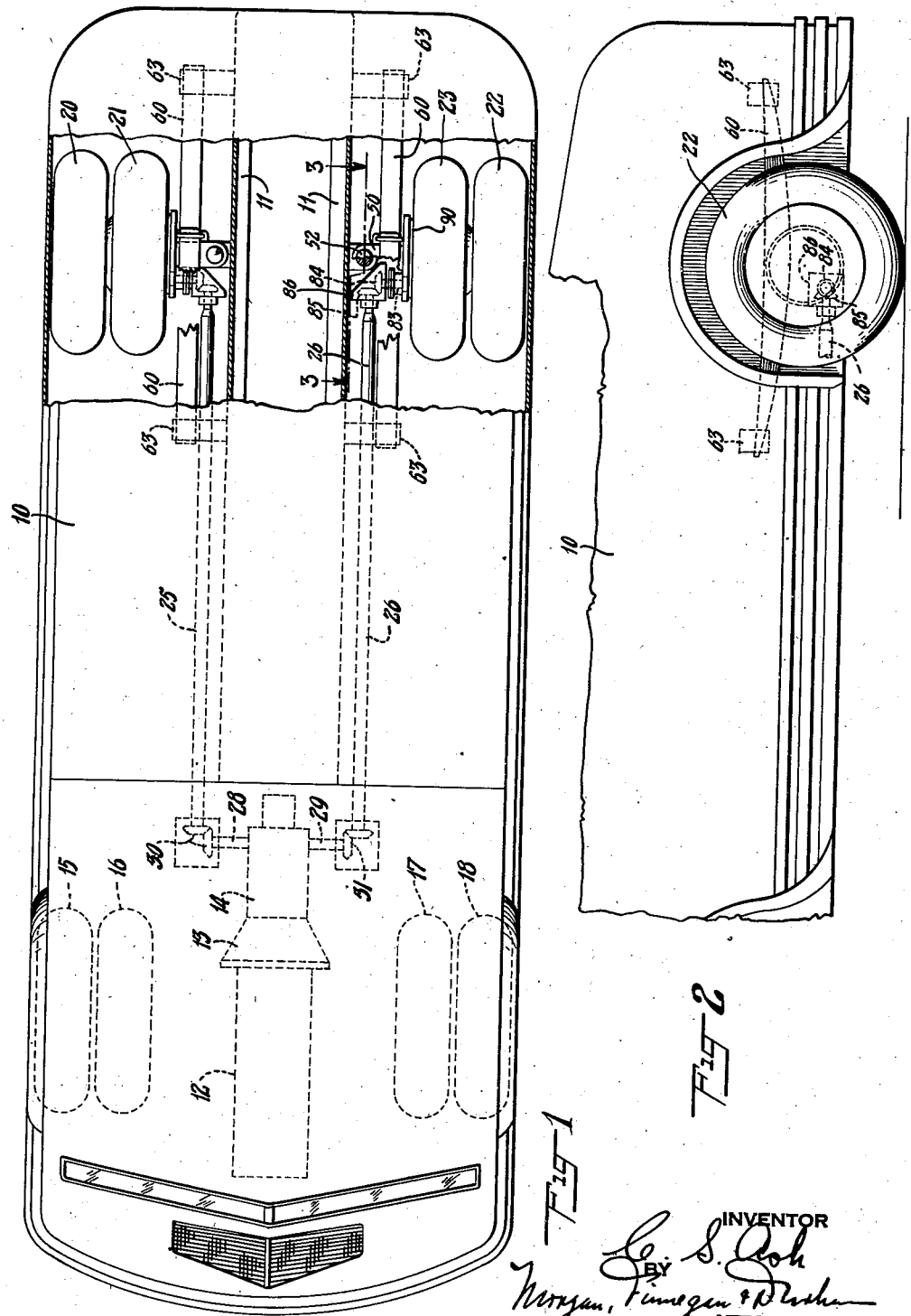

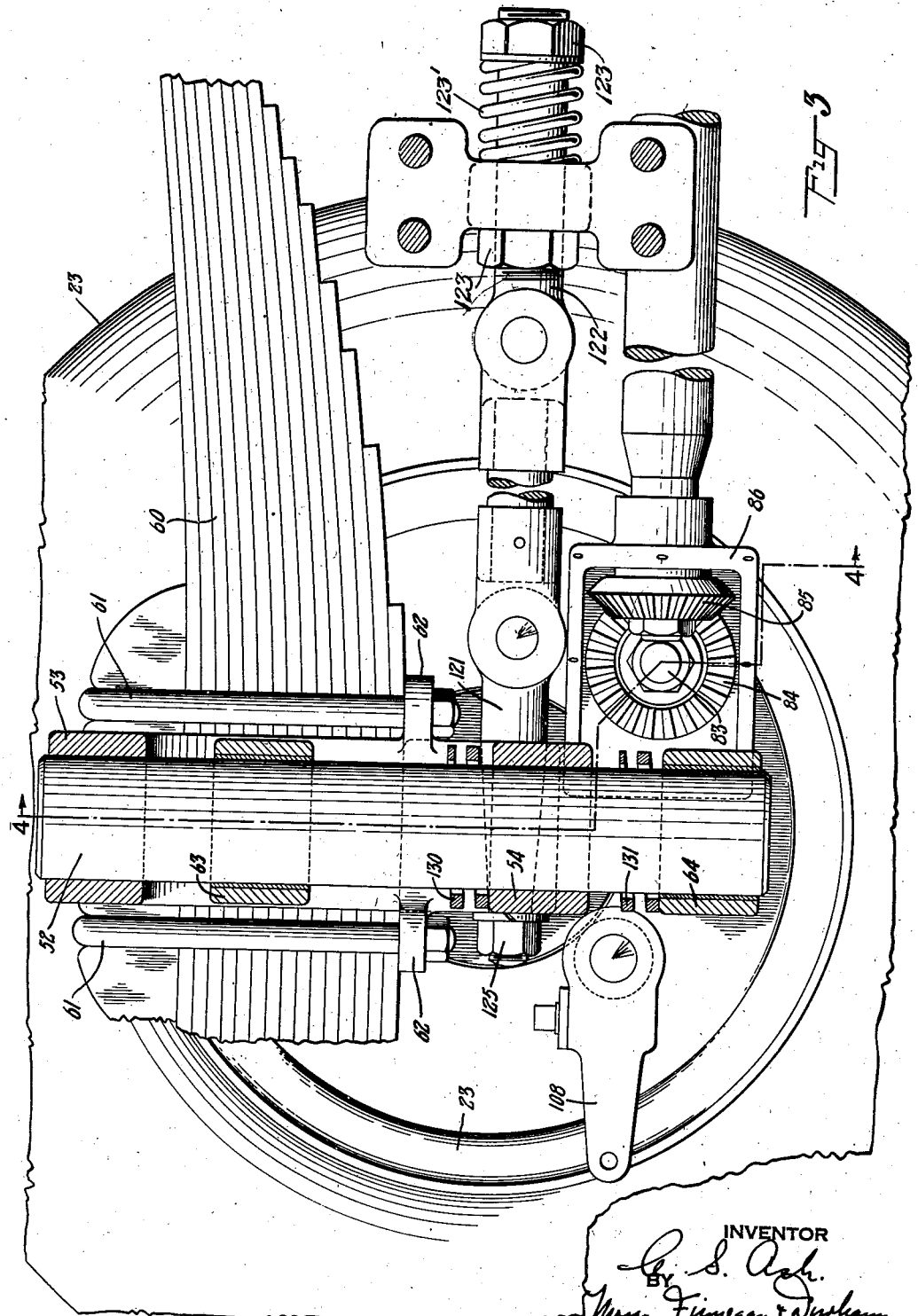

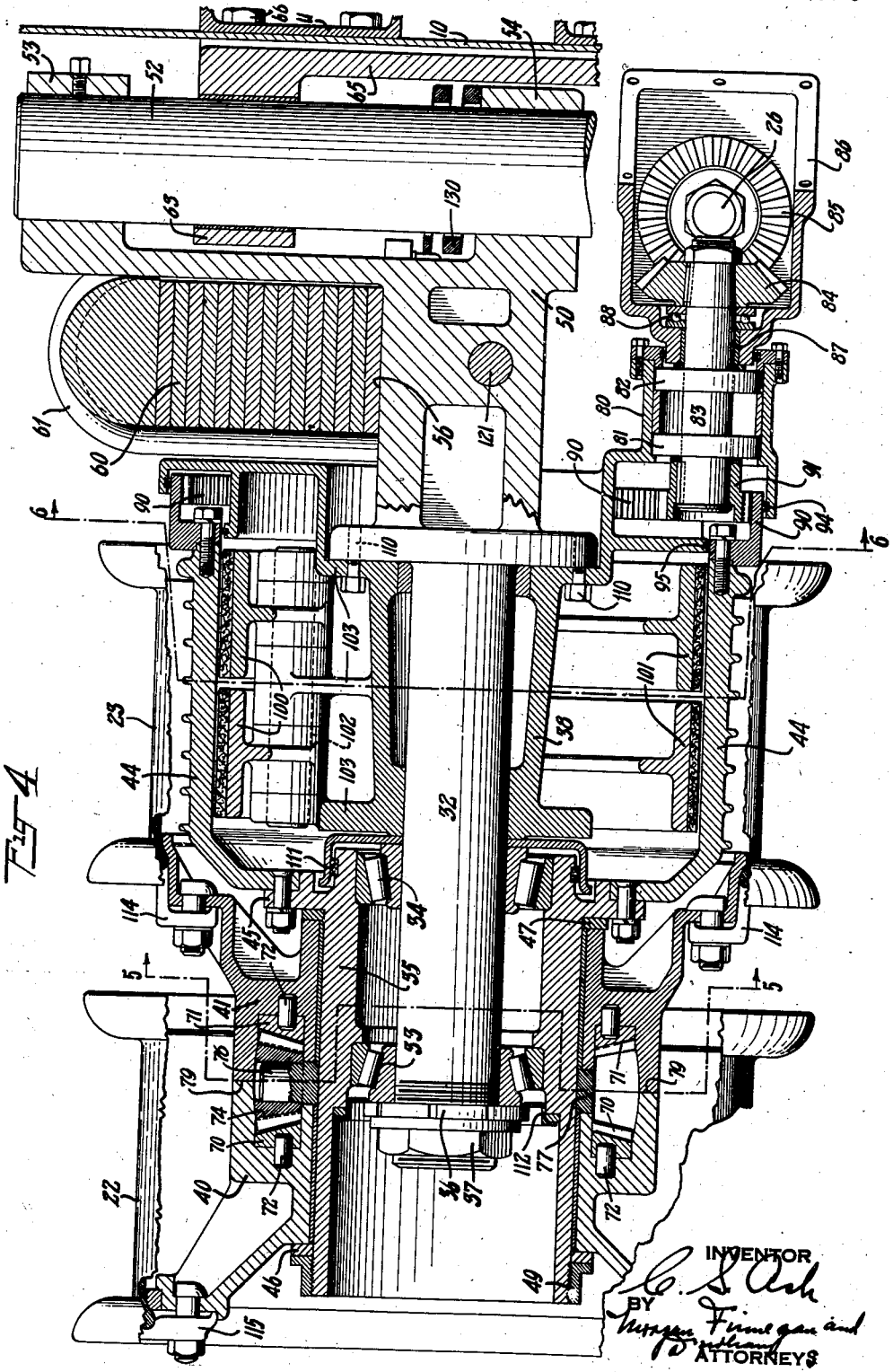

Oct. 13, 1942.  C. S. ASH  2,298,334
AUTOMOTIVE VEHICLE
Filed April 1, 1940  4 Sheets-Sheet 4

INVENTOR
C. S. Ash
BY
Morgan, Finnegan & Durham
ATTORNEYS

Patented Oct. 13, 1942

2,298,334

UNITED STATES PATENT OFFICE 2,298,334

AUTOMOTIVE VEHICLE

Charles S. Ash, Milford, Mich.

Application April 1, 1940, Serial No. 327,094

2 Claims. (Cl. 180—22)

The present invention relates to new and useful improvements in automotive road vehicles.

Objects and advantages of the invention will be set forth in part hereinafter and in part will be obvious herefrom, the same being realized and attained by means of the instrumentalities and combinations pointed out in the appended claims, The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a top plan view, with certain parts broken away, of a typical and illustrative embodiment of the present invention;

Figure 2 is a fragmentary side elevation of the rear of the vehicle shown in Figure 1;

Figure 3 is a detailed fragmentary side elevation, partly in section, of driven wheel structure and mounting in accordance with the present invention;

Figure 4 is a sectional view taken on the line 4—4 of Figure 3; and

Figure 5:
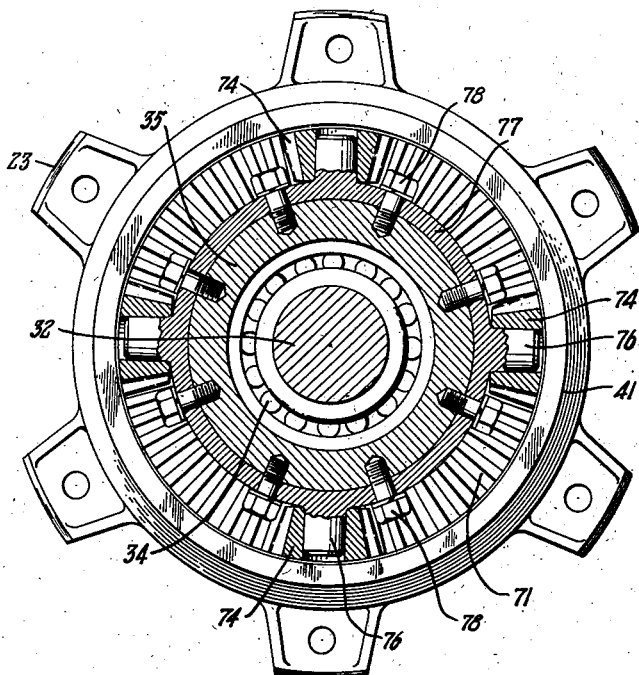
Figure 6:
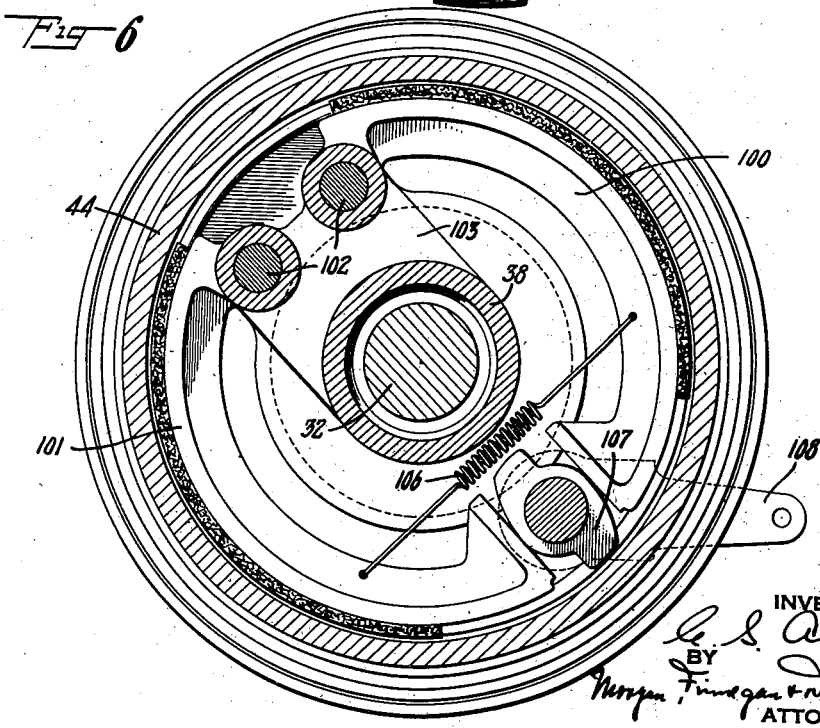

Figures 5 and 6 are sectional views taken on the lines 5—5 and 6—6 of Figure 4.

The present invention has for its object the provision of a novel and improved heavy duty automotive road vehicle having improved load distribution. The invention also provides an efficient road vehicle for carrying relatively compact and heavy loads which has a relatively low center of gravity and in which the front and rear axles of the vehicle may be substantially equally loaded. The invention further provides a heavy duty road vehicle particularly adapted for transporting relatively large quantities of hazardous materials such as gasoline with an unusually high degree of safety and economy.

In accordance with the present invention, illustratively shown as applied to a gasoline tank truck, the vehicle comprises a tank or other vehicle body, which may serve as one of the principal frame members, and with independently mounted and sprung dual wheels at the front and rear of the vehicle and at each side thereof. Preferably, the dual rear wheels of the vehicle are each driven and the dual wheels at the front of the vehicle are dirigible, and the vehicle motor is located well towards the front of the vehicle, its position being so located with reference to the tank that when the tank is loaded the front and rear dual wheels will be substantially equally loaded.

It will be understood that the foregoing general description and the following detailed description as well, are exemplary and explanatory of the invention but are not restrictive thereof.

Referring now in detail to the illustrative embodiment of the present invention as shown in the accompanying drawings, the vehicle comprises a combined tank and frame 10 to the under part of which are attached parallel longitudinally extending channel frame members 11, and at the front of which is mounted a vehicle motor 12. At the forward end the vehicle is provided with independently rotatable dual wheels 15, 16, 17 and 18 which may be of the general form and construction as shown in my prior Patent No. 1,979,598, or of the form shown in my copending application Ser. No. 270,757, now Patent No. 2,264,785, issued Dec. 2, 1941. At the rear of the vehicle are provided two pairs of independently rotatable driven dual wheels 20, 21, 22 and 23, each pair being individually driven and individually spring mounted on the vehicle. Motor 12 is arranged to drive the dual wheels at either side of the rear of the vehicle through spaced apart, parallel, rearwardly extending, propeller shafts 25, 26, and at the rear of motor 12 is provided a conventional clutch 13 and a change speed and differential gear box 14. Laterally extending from the gear box 14 are the differentially driven shafts 28, 29 which drive shafts 25 and 26 through beveled gears 30 and 31, thereby clearing the central longitudinal portion of the vehicle so that the tank may be lowered as close as desired to the ground.

Figures 3 and 4 of the drawings show in detail the construction and mounting of the rear dual wheels, only one set of which will be described as they are substantially duplicates of each other. A stub axle 32 extends laterally to one side of the vehicle and on its outer end is provided the tapered roller bearings 33, 34 which support the hub sleeve 35 and are held in place by means of the washer 36, bearing nut 37 and the brake anchor and drive supporting casting 38. The outer surface of the hub sleeve 35 is finished as a cylinder and on it are supported the wheel hub 40 for the outer wheel 22, and the wheel hub 41 for the inner wheel 23, suitable journal bearings being provided between these wheel hubs 40 and 41 and the hub sleeve 35 so as to permit the wheels to have independent or relative rotation. Brake drum 44 is bolted to the brake drum attaching flange 45 formed integrally with and at the inner end of the hub sleeve 35, this brake drum substantially filling the space within the inner wheel rim. Thrust washers 46 and 47 are provided at the ends of the wheel hubs and the wheel hubs are held against axial movement by means of the brake attaching flange 45 and the threaded collar 49.

Each of the stub axles 32 is independently mounted on the truck frame or chassis on its own side of the vehicle, and for this purpose, stub axle 32 is formed integrally with a vertical bracket 50 in which is rigidly secured a vertical guide rod 52, bracket 50 being formed with two relatively heavy spaced apart lugs 53 and 54 which are apertured to receive the guide rod 52. Bracket 50 is also formed on its upper side with a spring pad surface 56, to which may be clamped the semieliptical leaf springs 60 which are secured to the bracket by means of the U-bolts 61 which pass through the small lugs 62 formed in front of and to the rear of the spring pad surface 56. In order to permit the guide rod 52 of the stub axle 32 to move only in a vertical direction, guide rod 52 passes through suitably journalled apertures in lugs 63 and 64 which project from and are a part of the bracket 65 attached to the vehicle tank and frame 10 by means of the screws 66.

Vehicle supporting springs 60 also serve to limit the movement of the wheels and stub axle 32 so that it has only vertical movement, and for this purpose the forward and rear ends of the springs 60 are connected to suitable shackles or other spring mountings 68 projecting laterally from the channel frames 11 and connected thereto, and these mountings 63 tend to keep the stub axle 32 from pivoting about the shaft 52 in addition to supporting the weight of the vehicle.

Means are provided for differentially driving each of the rear vehicle wheels, and for this purpose the hubs 40 and 41 of the wheels are provided with adjacent annular recesses in which are fitted ring gears 70 and 71 fixed to the wheel hubs by means of the pins 72 and meshing with the planetary beveled pinions 74 which are freely rotatable on studs 76 projecting radially from the spider 77 which is securely bolted to the hub sleeve 35 by means of cap screws 78. The adjacent faces of the hubs 40 and 41 are preferably surfaced to form a bearing against the side faces of the spider 77 near the hub sleeve 35, and are provided with contacting faces 79 which retain lubricant within and prevent the entry of dirt into the space occupied by the gears 70, 71 and 74.

The brake and drive supporting casting 38 is provided with a downwardly and inwardly extending portion 80 in which are retained bearings 81, 82 rotatably supporting the short shaft 83, at the outer end of which is provided a drive pinion 91, keyed to shaft 83 and in driving mesh with ring gear 90. At the inner end of shaft 83 is a bevel gear 84 meshing with bevel gear 85 carried at the rear end of shaft 26 and enclosed within a lubricant retaining housing 86, this housing being sealed with respect to shaft 83 by journal 87 and also forming the seat for a thrust bearing 88 between gear 84 and the outer end of housing 86.

In order to steady the wheels 22 and 23 as driving or braking torque is applied to them, a radius rod 120 is provided pivotally connected at its ends to links 121 and 122. Link 122 is threaded and secured by nuts 123 to a bracket 124 mounted on the side of frame member 11, while link 121 is tapered and provided at its end with a threaded portion and nut 125 so that it may be secured within a similarly tapered hole in bracket 50 immediately beneath the spring pad 56. A spring 123' may be positioned between the outer nut 123 and the bracket 124 to permit a short sliding movement of the radius rod 120. This radius rod allows free vertical movement of the wheel assembly at the same time resisting any torsional action about shaft 52 as a pivot.

Mounting bracket portion 63 is preferably positioned between the bracket portions 53 and 54, and short sections of relatively stiff helical springs 130 and 131 are preferably provided about guide rod 52 and between bracket portion 54 and the bracket portions 63 and 64 so as to provide additional springing in case the wheels tend to bottom the spring 60 or in case of excessive rebound.

Attached to the inner edge of the brake drum 44 is an internal ring gear 90, meshing with and driven by pinion 91 keyed to the outer end of shaft 83 so that the drive is applied from shaft 83 to gear 90, brake drum 44, hub sleeve 35, to drive the differential pinions 74 and thereby drive ring gears 70 and 71 and wheels 22 and 23.

Dirt is excluded from and lubricant is retained within the space adjacent the teeth of ring gear 90 by means of the sealing rings 94 and 95 which are carried by the brake and drive supporting casting 38 and contact with the outer and inner portions respectively of the ring gear 90.

Means are provided for braking the wheels of the vehicle and as shown in Figures 4 and 6 comprise two pairs of arcuate brake shoes 100, 101 mounted within the brake drum 44 and pivotally supported on the shafts 102 which are mounted in lugs 103 formed integrally with the brake anchor casting 38. Shoes 100 and 101 are normally held in retracted position by means of spring 106 and are expanded into braking position by means of a conventional cam 107 and brake actuating arm 108. Brake anchor casting 38 is secured to the spindle 32 against movement by means of the cap screws 110 and as the brakes are applied drum 44 is retarded and the braking force is applied to hub sleeve 35, differential pinion 74, ring gears 70 and 71, so as to apply an equal braking force to the two wheels 22 and 23.

Means are provided for retaining lubricant on the bearings 33 and 34 and for preventing the lubricant leaking into the brake mechanism. For this purpose, a sealing ring 111 is provided between the outer end of the brake anchor casting 38 and the inner face of bearing 34, and another sealing ring 112 is provided on the outside of bearing 33 and is retained in place by the washer 36.

Any suitable form of tire mounting rims may be used and these are secured to their respective wheels by any suitable means such as the lugs 114 and 115.

The invention not only provides a vehicle having an extremely low center of gravity with the load substantially evenly distributed between the front and rear wheels, but also provides a vehicle which has an unusually high degree of safety as a sudden blowout or other failure will not seriously impair the manœuverability of the vehicle. Also, the independent suspension of the dual wheels tends to produce a vehicle which is more stable in its road characteristics, and this feature, together with the use of the dual wheels, tends to reduce road hazards such as skidding, etc. Thus, the illustrative embodiment of the invention provides a vehicle which is peculiarly adapted for the transportation of relatively heavy compact and hazardous cargoes such as gasoline, etc.

The invention in its broader aspects is not limited to the specific mechanisms shown and described but departures may be made therefrom within the scope of the accompanying claims without departing from the principles of the invention and without sacrificing its chief advantages.

What I claim is:

1. In a motor vehicle, a pair of dual wheels, a relatively short axle, a driving member rotatable about the axle and on which the wheels are supported in spaced-apart relation for relative rotation, differential gearing interconnecting the wheels and driving member for driving the wheels from the driving member, a brake member attached to the driving member, means for driving the brake member to drive the driving member and wheels, and means for connecting the axle to a vehicle at the inner end of the axle including a vertical guide for the axle, a leaf spring extending at right angles to the axle between the vertical guide and wheels and connecting the axle and vehicle and resisting vertical movement of the axle and a radius rod extending at right angles to the axle and interconnecting the axle and vehicle whereby only vertical movement of the axle is permitted.

2. In a motor vehicle, a pair of dual wheels, a relatively short axle, a driving member rotatable about the axle and on which the wheels are supported in spaced-apart relation for relative rotation, differential gearing inter-connecting the wheels and driving member for driving the wheels from the driving member, a brake member attached to the driving member, means for driving the brake member to drive the driving member and wheels, and means for connecting the axle to a vehicle at the inner end of the axle including springs connecting the axle and vehicle and resisting vertical movement of the axle and a radius rod extending at right angles to the axle and interconnecting the axle and vehicle whereby only vertical movement of the axle is permitted.

CHARLES S. ASH.